(12) United States Patent
Belliveau

(10) Patent No.: US 9,188,845 B2
(45) Date of Patent: Nov. 17, 2015

(54) PROGRAMMABLE DE-FOGGER SYSTEM FOR A LIGHT PROJECTOR

(71) Applicant: Richard S. Belliveau, Austin, TX (US)

(72) Inventor: Richard S. Belliveau, Austin, TX (US)

(73) Assignee: BAKCO LIGHTING SYSTEMS, INC., Austin, TX (US)

( * ) Notice: Subject to any disclaimer, the term of this patent is extended or adjusted under 35 U.S.C. 154(b) by 0 days.

(21) Appl. No.: 14/294,198

(22) Filed: Jun. 3, 2014

(65) Prior Publication Data

US 2014/0285775 A1    Sep. 25, 2014

Related U.S. Application Data

(62) Division of application No. 13/350,932, filed on Jan. 16, 2012, now Pat. No. 8,770,764.

(51) Int. Cl.
| | |
|---|---|
| G03B 21/16 | (2006.01) |
| F21V 5/04 | (2006.01) |
| F21V 29/504 | (2015.01) |
| F21V 29/60 | (2015.01) |
| G03B 21/10 | (2006.01) |
| H04N 9/31 | (2006.01) |
| F21W 131/406 | (2006.01) |

(52) U.S. Cl.
CPC . *G03B 21/16* (2013.01); *F21V 5/04* (2013.01); *F21V 29/504* (2015.01); *F21V 29/60* (2015.01); *F21W 2131/406* (2013.01); *G03B 21/10* (2013.01); *H04N 9/3141* (2013.01)

(58) Field of Classification Search
CPC ... H04N 9/3141; H04N 9/3197; G03B 21/10; G03B 21/14
USPC .......... 353/31, 38, 52, 57, 102, 119, 122; 348/239, 595, 743–747; 349/5, 7–9, 349/11, 57, 114, 67; 362/235, 294, 311.01, 362/335; 396/448, 452
See application file for complete search history.

(56) References Cited

U.S. PATENT DOCUMENTS

| | | | |
|---|---|---|---|
| 4,171,211 A | 10/1979 | Carter | 55/493 |
| 4,323,374 A | 4/1982 | Shinagawa | 96/58 |
| 4,701,833 A | 10/1987 | Bornhorst | 362/294 |
| 4,724,515 A * | 2/1988 | Matsuki et al. | 362/503 |
| 4,969,731 A | 11/1990 | Ogino et al. | |
| 5,584,554 A | 12/1996 | Moore et al. | |
| 5,828,485 A | 10/1998 | Hewlett | 359/291 |
| 5,829,868 A | 11/1998 | Hutton | 362/276 |
| 5,988,817 A | 11/1999 | Mizushima | 353/94 |
| 6,057,958 A | 5/2000 | Hunt | 359/291 |

(Continued)

OTHER PUBLICATIONS

Catalyst Media in Motion, (c) 2002 High End Systems, Inc.

(Continued)

*Primary Examiner* — Sultan Chowdhury
(74) *Attorney, Agent, or Firm* — Walter J. Tencza, Jr.

(57) ABSTRACT

A light projector for operation during a show that contains theatrical haze. The light projector may include a light source, a lens, a fan, and a housing having an inner chamber. The lens may have a first side and a second side. The first side of the lens may be contained within the inner chamber of the housing. The second side the lens may be outside of the inner chamber of the housing. The fan may be configured to be operated to generate air flow inside the inner chamber of the housing. A substantial portion of the air flow may be directed to impinge upon the first side of the lens to cause de-fogging of theatrical haze condensate on the first side of the lens.

20 Claims, 6 Drawing Sheets

(56) References Cited

U.S. PATENT DOCUMENTS

| | | | |
|---|---|---|---|
| 6,156,089 A | 12/2000 | Stemmer | 55/467 |
| 6,188,933 B1 | 2/2001 | Hewlett | 700/19 |
| 6,208,087 B1 | 3/2001 | Hughes | 315/291 |
| 6,219,093 B1 | 4/2001 | Perry | 348/135 |
| 6,710,762 B1 | 3/2004 | Hasegawa | 345/101 |
| 6,988,807 B2 | 1/2006 | Belliveau | |
| 7,048,383 B2 | 5/2006 | Belliveau | 353/57 |
| 8,591,038 B2 | 11/2013 | Sugano | |
| 2005/0088576 A1 | 4/2005 | Hirata et al. | |
| 2006/0050351 A1 | 3/2006 | Higashiki | |
| 2007/0002191 A1* | 1/2007 | Hashizume et al. | 349/5 |
| 2007/0285780 A1* | 12/2007 | Imafuku et al. | 359/514 |
| 2008/0174742 A1* | 7/2008 | Ito | 353/31 |
| 2010/0290010 A1* | 11/2010 | Hirata | G02B 13/18 353/37 |

OTHER PUBLICATIONS

High End Systems Product Line 2001.

* cited by examiner

US 9,188,845 B2

PROGRAMMABLE DE-FOGGER SYSTEM FOR A LIGHT PROJECTOR

CROSS REFERENCE TO RELATED APPLICATION(S)

The present application is a divisional of and claims the priority of U.S. patent application Ser. No. 13/350,932, titled "PROGRAMMABLE DE-FOGGER SYSTEM FOR A LIGHT PROJECTOR", filed on Jan. 16, 2012.

FIELD OF THE INVENTION

This invention relates to improved methods and apparatus concerning light projectors used on theatrical stages.

BACKGROUND OF THE INVENTION

Light projectors are often used on theatrical stages to light entertainers. Some light projectors make use of patterns or electronic light valves to project images onto projection screens or stage surfaces.

U.S. Pat. No. 7,048,383, to Belliveau discloses a filter system method and states in its "Background of the Invention": "During a theatrical presentation the Image projection lighting devices are often operated in conjunction with theatrical fog generating devices. The theatrical fog or smoke generating devices are used to create an airborne haze that can be used as a projection surface creating three dimensional imagery. The fog generating devices create the airborne haze by propelling minute particles into the air which can remain suspended in the air for a considerable time. The minute particles are commonly created by the fog generating devices by atomization of oils or glycols. The glycol or mineral oil particles (referred to herein as fog particles) can each range in size from between twenty microns to below 0.1 micron.

When lighting devices such as image projection lighting devices contain complex optical and electronic components the fog particles may be drawn though the cooling system and may condense on the various optical components diffusing the projected image or shortening the life of the components." (U.S. Pat. No. 7,048,383 to Belliveau, col. 2, line 30-col. 2, line 49)

Filters systems like that disclosed in U.S. Pat. No. 7,048,383 to Belliveau amount to a considerable expense of a light projector when designing an economical light projector system. There is still a need however to prevent critical optical components from condensing with fog particles when by design no adequate filter system is incorporated into the product. Output lenses of image projection lighting devices, may typically have an inner surface that is located in the internal environment to a lamp housing and an external surface that is exposed an external environment of the lamp housing. Because there can be a temperature differential between the inner surface and the outer surface, theatrical fog haze can typically form condensate on the inner surface or even the outer surface. When the condensation forms on the lens the output light can become defused by the light scattering properties of the condensate. The output lens can be a lens having an optical power or a transparent output window.

More recent light projectors may comprise a light source of a solid state LED light source that emits less infrared energy than halogen or arc light sources making the problem of controlling condensation by theatrical haze even more difficult because the output lens absorbs less infrared energy from the light source and thus operates at a lower temperature.

There is a need to find a method of reducing condensate on at least one optical component of a light projector without using a costly filtration system.

SUMMARY OF THE INVENTION

One or more embodiments of the present invention provide a light projector for operation during a show that contains theatrical haze. The light projector may include a light source, a lens, a fan, and a housing having an inner chamber. The lens may have a first side and a second side. The first side of the lens may be contained within the inner chamber of the housing. The second side of the lens may be outside of the inner chamber of the housing. The fan may be configured to be operated to generate air flow inside the inner chamber of the housing. The fan may be configured to be operated to generate air flow inside the inner chamber of the housing. A substantial portion of the air flow may be directed to impinge upon the first side of the lens to cause de-fogging of theatrical haze condensate on the first side of the lens.

The light projector may be further comprised of an operator input panel in communication with the fan, and configured to allow an operator to select any one of a plurality of de-fogging functions to be executed by the fan. The plurality of de-fogging functions may include operating the fan to cause de-fogging only when the light projector is not being used to project light. The plurality of de-fogging functions may include operating the fan when the light projector is projecting light.

The light projector may be further comprised of a communications port; and the communications port may be configured to receive de-fogger commands from an external control device. The communications port may be in communication with the fan to execute the de-fogger commands. A first one of a plurality of de-fogging functions to be executed by the fan may be configured to be selected by an operator of the external control device.

The external control device may be a lighting console. The communications port may receive de-fogger commands compliant with the DMX protocol. The first one of the plurality of de-fogging functions selected by the operator may operate the fan to cause de-fogging only when the light projector is not being used to project light.

In at least one embodiment of the present invention a light projector for operation during a show that contains theatrical haze may be provided. The light projector may include a light source, a lens, a resistive conductor, and a housing having an inner chamber. The lens may have a first side and a second side. The first side of the lens may be contained within an inner chamber of the housing. The second side of the lens may be outside of the inner chamber of the housing. The resistive conductor may be positioned relative to the lens to cause de-fogging of theatrical haze condensate on the lens. The resistive conductor may be applied to the first side of the lens. The resistive conductor may be a power resistor.

In at least one embodiment of the present invention a light projector for operation during a show that contains theatrical haze is provided. The light projector may include a light source, a lens, an infrared light source, and a housing having an inner chamber. The lens may have a first side and a second side. The first side of the lens is contained within the inner chamber of the housing. The second side the lens may be outside of the inner chamber of the housing. The infrared light source may be positioned relative to the lens to project infrared light onto the lens to cause de-fogging of theatrical haze condensate on the lens. The infrared light source may be project light to a perimeter of the lens to cause heating of the lens. The infrared light source may be comprised of at least one infrared light emitting diode.

At least one embodiment of the present invention may include a method comprising generating an air flow inside an inner chamber of a housing of a light projector, so that a substantial portion of the air flow is directed to impinge upon a first side of a lens fixed to the housing to cause de-fogging of theatrical haze condensate on the first side of the lens. The method may be further comprised of selecting any one of a plurality of de-fogging functions via an operator input panel fixed to the housing to cause de-fogging of theatrical haze condensate on the first side of the lens. The plurality of de-fogging functions may include operating a fan to cause de-fogging only when the light projector is not being used to project light from the housing; and/or operating the fan when the light projector is projecting light from the housing.

The method may be further comprised of receiving de-fogger commands at a communications port fixed to the light projector from an external control device; and causing the received de-fogger commands to be executed by a fan to generate the air flow.

The external control device may be a lighting console. The communications port may receive de-fogger commands compliant with the DMX protocol. The first one of a plurality of de-fogging functions selected by the operator may operate the fan to cause de-fogging only when the light projector is not being used to project light.

In another embodiment of the present invention, a method is provided, comprising fixing a light source, and a lens to a housing, and fixing a resistive conductor to the housing, in a position with respect to the lens so that the resistive conductor causes de-fogging of theatrical haze condensate on the lens. The resistive conductor may be applied to the first side of the lens. The resistive conductor may be a power resistor. The method may further include fixing a light source, and a lens to a housing, and fixing an infrared light source, so that the infrared light source projects infrared light onto the lens to cause de-fogging of theatrical haze condensate on the lens. The infrared light source may project light to a perimeter of the lens to cause heating of the lens. The infrared light source may be comprised of at least one infrared light emitting diode.

DETAILED DESCRIPTION OF THE DRAWINGS

Figure 1:
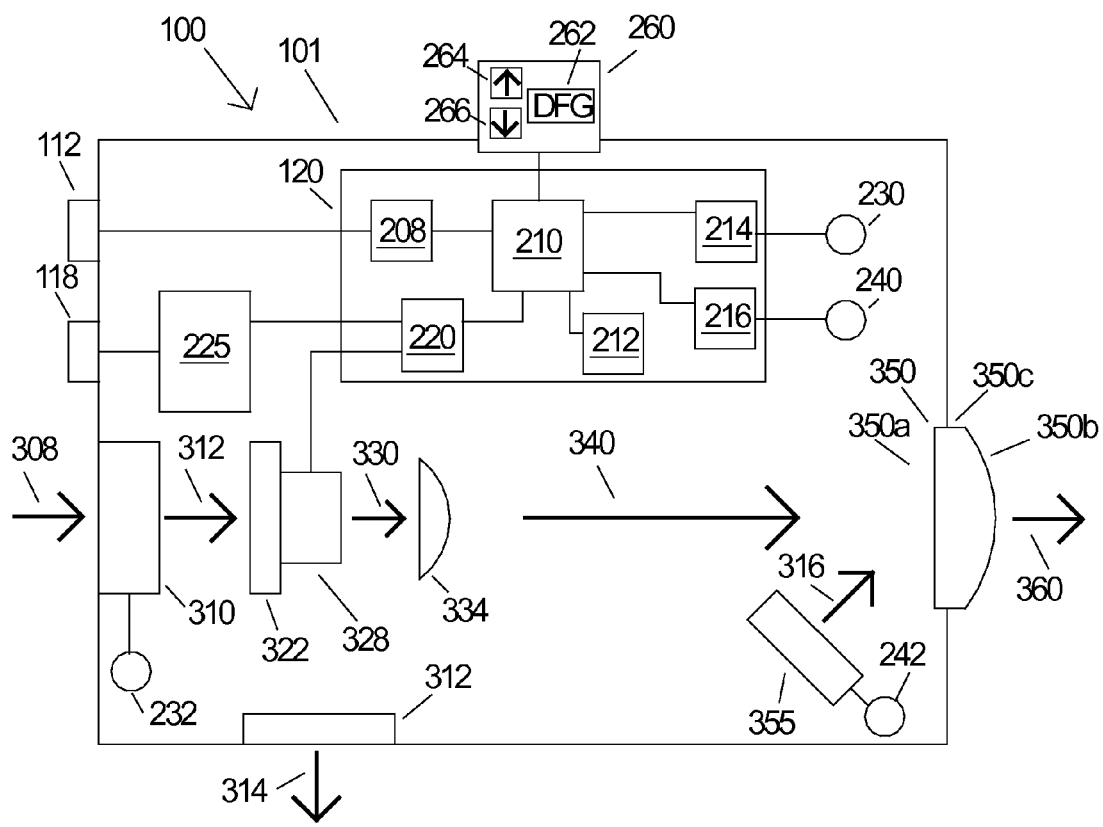
FIG. 1 shows a diagram of an apparatus in accordance with an embodiment of the present invention.

FIG. 1 shows a diagram of an apparatus 100 in accordance with an embodiment of the present invention.

The apparatus 100 includes a lamp housing 101, a communications port 112, a power input connection 118, a processor circuit board 120, communications port 208, a processor 210, a light source control 220, a computer or electronic memory 212, a device output control 214, a connection point 230, a connection point 232, a device output control 216, a connection point 240, a connection point 242, a power supply 225, an external operator control panel 260, a user input key 264, a user input key 266, display device 262, a cooling fan 310, a heat sink 322, a light source 328, a light condensing lens 334, an output lens 350, an air exiting vent 312, and a de-fogger fan 355. An inner chamber 101b is located within the housing 101, and is shown in FIGS. 1, 3A, 3B, and 4. An external environment 101a, outside of the inner chamber 101b and housing of the housing 101 is also shown in FIGS. 1, 3A, 3B, and 4.

The lamp housing 101 may be an external lamp housing. The communications port 112 may be an external communications port connection that may be a DMX compatible connection. The power input connection 118 may be a power line connection. The processor circuit board may be a microprocessor circuit board. The processor 210 may be a microprocessor.

The connection point 230 may connect to connection point 232 (for simplification of wiring to light source cooling fan 310). The connection point 240 may connect to connection point 242 (for simplification of wiring to de-fogger fan 355).

An air direction arrow 308 shows the direction for input air passing through light source cooling fan 310. An air direction arrow 312 shows the direction for light source cooling air passing through fan 310 to cool light source heat sink 322 attached to light source 328.

The light source LED 328 may be a solid state light source LED (light emitting diode). The heat sink 322 may be a heat sink for the light source LED 328.

A light path direction arrow 330 shows a light path direction to the light condensing lens 334. A light path direction arrow 340 shows a light path direction for light exiting condensing lens 334.

The output lens 350 has a side 350a that is in the internal environment (i.e. within the housing 101) and a side 350b that is in the external environment (i.e. outside of the housing 101). A light path direction arrow 360 shows the direction of projected light exiting the light projector 100. An air direction arrow 314 shows the direction of exiting light source cooling air. An air direction arrow 316 shows the direction of air flow due to de-fogger fan 355.

The output lens 350 has a first surface 350a that is located in the internal environment to the lamp housing 101 and an external surface 350b that is exposed an external environment of the lamp housing 101. Because there can be a temperature differential between the first surface 350a and the second surface 350b theatrical fog haze can typically form condensate on the surface 350a but can also form on side 350b. When the condensation forms on the lens 350 the output light as shown by arrow 360 can become defused by the light scattering properties of the condensate. The output lens 350 can be a lens having an optical power or a transparent output window.

The use of a solid state LED light source for light source 328 that emits less infrared energy than halogen or arc light sources makes the problem of controlling condensation by theatrical haze even more difficult because the output lens 350 absorbs less infrared energy from the light source and thus operates at a lower temperature.

Figure 2A:
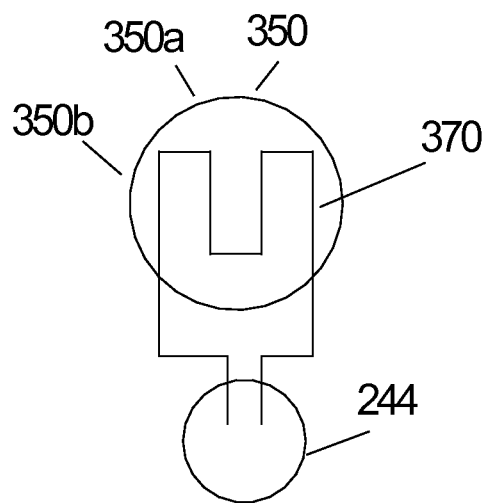
FIG. 2A shows a front view of an output lens for use with an apparatus of FIG. 3A.
Figure 3A:
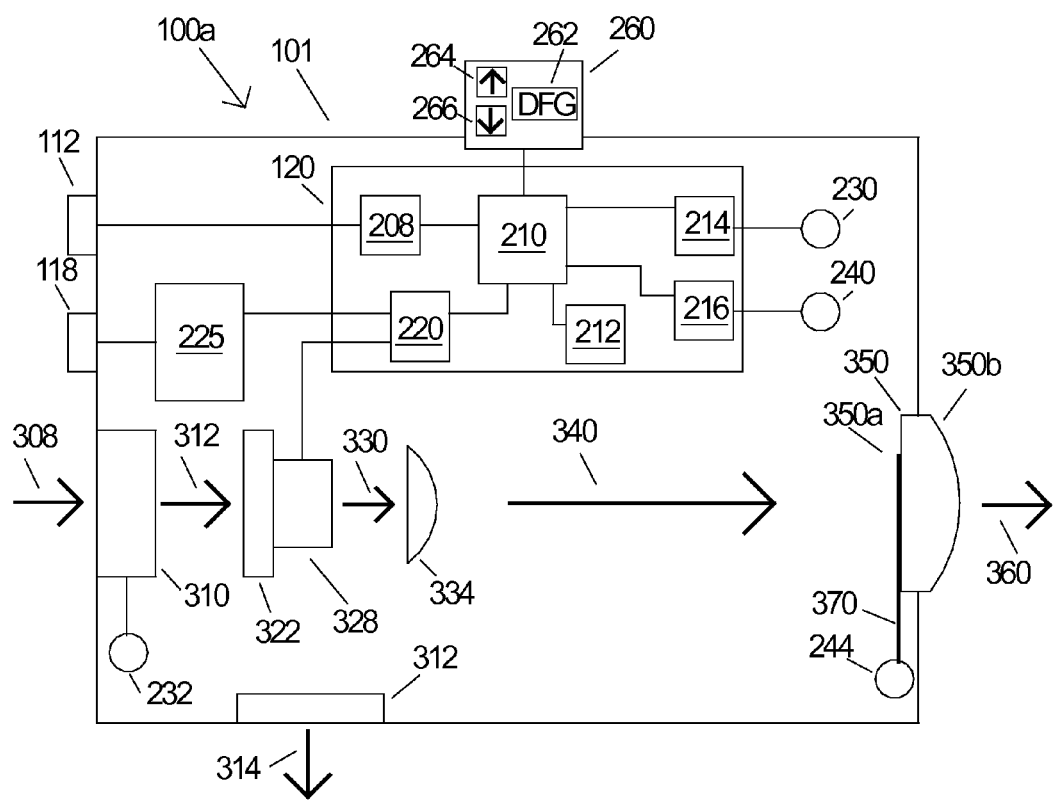
FIG. 3A shows a diagram of an apparatus of another embodiment of the present invention.

FIG. 2A shows a front view of the output lens 350 along with a resistive conductor 370 for use with an apparatus 100a of FIG. 3A.

Figure 2B:
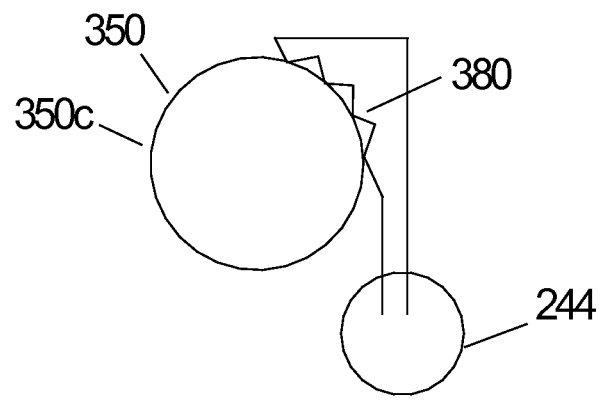
FIG. 2B shows a side view of another embodiment of an output lens for use with an apparatus of FIG. 3B.
Figure 3B:
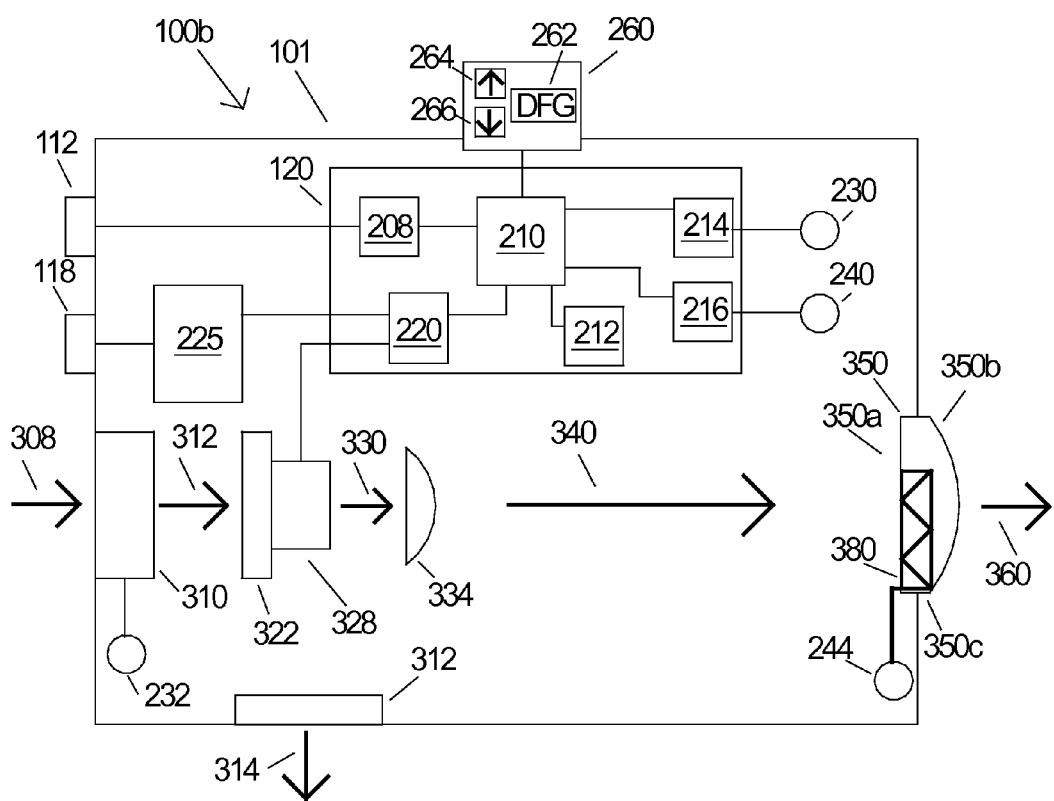
FIG. 3B shows a diagram of an apparatus of another embodiment of the present invention.

FIG. 2B shows a side view of the output lens 350 along with a resistive conductor 380 for use with the apparatus 100b if FIG. 3B.

Figure 2C:
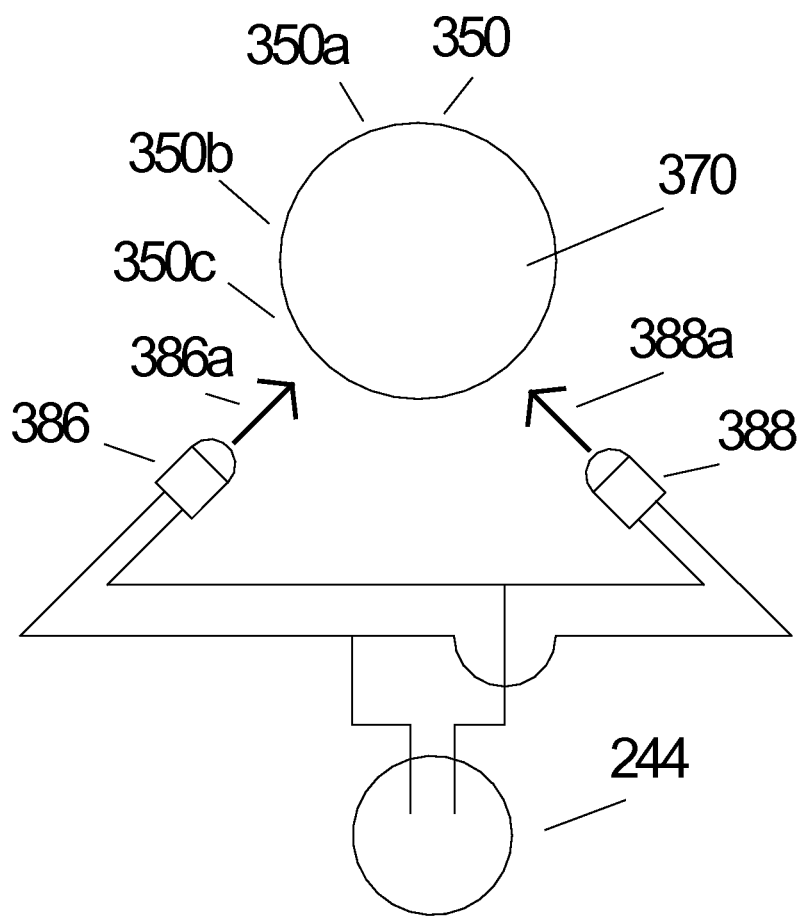
FIG. 2C shows a front view of a further embodiment of an output lens for use with the apparatus of FIG. 4.
Figure 4:
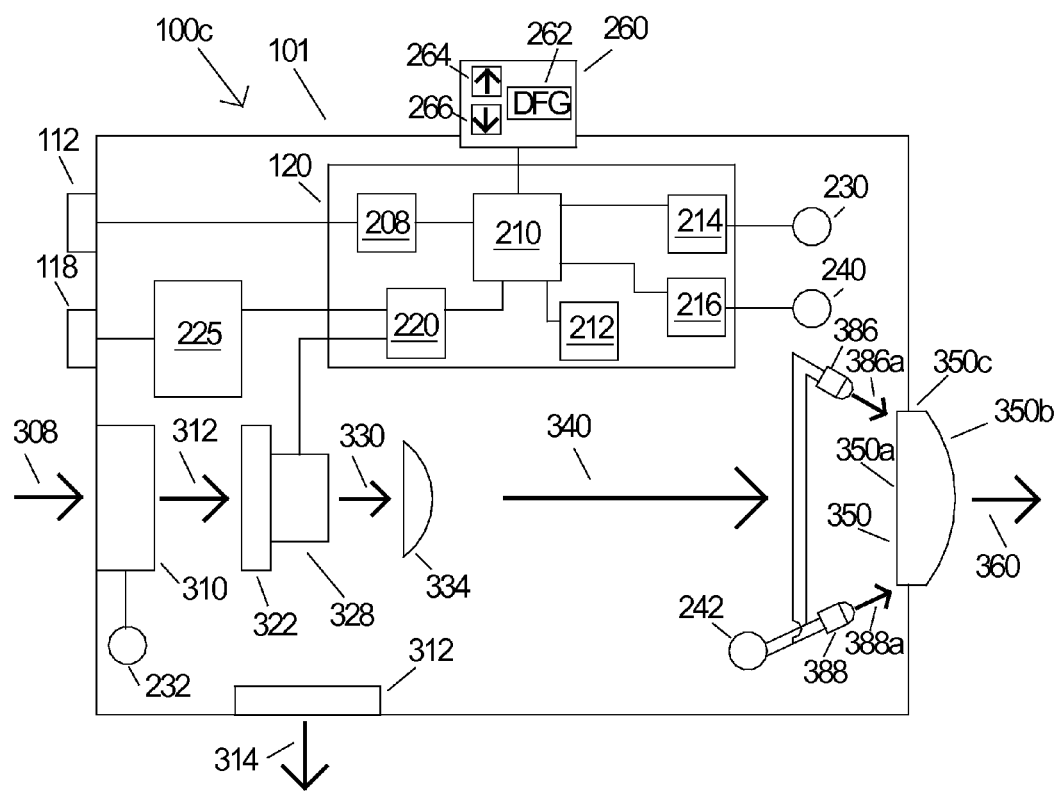
FIG. 4 shows a diagram of an apparatus of a further embodiment of the present invention.

FIG. 2C shows a front view of the output lens 350 along with infrared light sources 386 and 388 for use with an apparatus 100c of FIG. 4.

FIG. 3A shows a diagram of an apparatus 100a of another embodiment of the present invention. The apparatus 100a is identical to the apparatus 100 except as will be described. The apparatus 100a includes connection point 244 and a resistive conductor 370 which are not present in apparatus 100. Apparatus 100 of FIG. 1 includes connection point 242 and defogger fan 355, which are not present in apparatus 100a. The diagram of apparatus 100 in FIG. 1 also shows direction arrow 316 for air flow due to defogger fan 355, which is not present in FIG. 3A.

FIG. 3B shows a diagram of an apparatus 100b of another embodiment of the present invention. The apparatus 100b is identical to the apparatus 100 except as will be described. The apparatus 100b includes connection point 244 and a resistive conductor 380 which are not present in apparatus 100. Apparatus 100 of FIG. 1 includes connection point 242 and defogger fan 355, which are not present in apparatus 100b. The diagram of apparatus 100 in FIG. 1 also shows direction arrow 316 for air flow due to defogger fan 355, which is not present in FIG. 3B.

FIG. 2A and FIG. 3A, together, show an alternate method of de-fogging showing a resistive conductor 370 that dissipates heat. The resistive conductor 370 can be applied to the lens 350 on either side 350a or on side 350b, shown in FIG. 1, or on both sides 350a and 350b. The resistive conductor 370 may be applied to either surface or side 350a or 350b of the output lens 350 or may be molded into the optical material that the lens 350 is comprised of.

FIG. 2B and FIG. 3B, together, show an alternate method of de-fogging showing a resistive conductor 380 that dissipates heat. The resistive conductor 380 (which may be a power resistor package) may be placed around the lens 350 on the perimeter surface 350c in order to aid in the heating of the lens 350.

In any case a resistive conductor, such as 370 or 380 is used to apply heat to the lens 350 in order to raise the temperature of the lens 350 and cause theatrical fog particles to evaporate from the lens 350 at a more rapid rate reducing or eliminating condensate.

The resistive conductor 370 of FIG. 2A or the resisitive conductor 380 of FIG. 2B may be variably controlled by the device output control 216 (shown in FIGS. 3A and 3B), (through connection points 244 and 240 shown for simplification of the drawing of FIGS. 3A and 3B). The resistive conductor 370 of FIG. 2A or the resistive conductor 380 of FIG. 2B may be variably controlled to be off, on or dissipating variable wattage under the control of the device output control 216.

In this case as shown in FIGS. 3A and 3B the device output control 216 and output connection 240 (for simplification) would be connected to connection point 244 to supply power to the resistive conductor 370 (or 380) to raise the temperature of the surfaces (such as surfaces or sides 350a, 350b, and 350c (shown in FIG. 1) of the lens 350. Raising the temperature of the lens 350 causes the theatrical fog particles to evaporate at an increased rate helping to prevent condensate from forming on the surfaces or sides 350a, 350b, and 350c of the lens 350.

FIG. 4 shows a diagram of an apparatus 100c of another embodiment of the present invention. The apparatus 100c is identical to the apparatus 100 except as will be described. The apparatus 100c includes infrared light sources 386 and 388, which are not present in apparatus 100 of FIG. 1. FIG. 4 shows light direction arrow 386a to show direction of light from infrared light source 386, and light direction arrow 388a to show direction of light from infrared light source 388. Light direction arrows 386a and 388a are also not present in FIG. 1.

FIG. 2C shows another variation of an embodiment of the present invention where lens 350 on any of the plurality of sides or surfaces 350a, 350b or 350c has infrared energy directed towards the lens 350 in order to raise the operating temperature or the lens 350. Shown are a plurality of infrared light sources 386 and 388 with corresponding infrared light output arrows 386a and 388a. The infrared light is directed towards the lens 350 at any surface or side 350a, 350b or the perimeter surface 350c to raise the temperature of the lens and cause the theatrical fog particles to evaporate from the lens 350 at a more rapid rate reducing or eliminating condensate.

In this case as shown in FIG. 4 the device output control 216 and output connection 240 (for simplification) would be connected to connection point 242 to supply power to the infrared light sources 386 and 388 that emit infrared light upon the lens 350 as shown by the corresponding infrared light direction arrows 386a and 388a to raise the temperature of the surface 350a, 350b or 350c of the lens 350. Raising the temperature of the surface 350a, 350b or 350c causes the theatrical fog particles to evaporate at an increased rate helping to prevent condensate from forming on the surface or side 350a of lens 350.

The preferred method of de-fogging is by the use of the de-fogging fan, such as fan 355, shown in FIG. 1, as it is the most economical to employ to the light projector. The fan 355 may be a tube axial fan, a blower fan or any other type of air moving device.

For FIG. 1 the de-fogger fan 355 is shown positioned to blow de-fogging air in the direction shown by arrow 316 onto the surface or side 350a of the output lens 350. The de-fogging air helps to keep the surface 350a dry and free from condensate. It is an important to note however that there can be a side effect to blowing de-fogging air directly on the lens 350 to accomplish de-fogging. Since the light projector or apparatus 100 does not have a filter system and incoming cooling air pulled in by the cooling fan 310 shown by the arrow 308 is not filtered, the air within the housing 101 is subject to containing dust and debris (along with the theatrical haze particles) found in the external operating environment of the light projector or apparatus 100. Blowing de-fogging air onto lens 350 that also contains debris can result in the lens becoming dirty so it is best to limit the de-fogging air to a minimum depending on the amount of theatrical haze used in the show.

In operation of the light projector 100, the exposure to theatrical haze particles may vary depending on the application. For some shows the requirement of theatrical haze for the show may be quite high and thus more de-fogging air to the lens surface 350a may be required. More de-fogging air can be accomplished by either duration (how long the de-fogger fan 355 is enabled to output air or by varying the CFM (cubic feet per minute) of the de-fogger fan 355).

Because there are varying conditions of theatrical fog during the show use of the light projector it is desirable for the operator of the light projector, such as apparatus 100, to choose varying de-fogging functions for de-fogging by the de-fogging fan 355, such as:

(1) Condition One, User Settable Function One:

For shows that utilize lower amounts of theatrical haze it is typically only necessary to use the de-fogging fan 355 when the light projector 100 is not being operated or projecting light in direction 360 from lens 350. In this case the de-fogger fan 355 can be switched on to de-fog the lens 350 when the light projector 100 is not being used. When the light projector 100 is not being used it is highly likely that the theatrical haze is not being generated in the show venue since in all likelihood the haze generator will also be off. The action of the de-fogger fan 355 is optimum (the air produced by the de-fogger fan 355 in the direction of arrow 316 is dryer since it contains lower amounts of haze particles) when there is low or no theatrical haze particles in the environment within the housing 101 because the venue is not continuously generating haze.

(2) Condition Two, User Settable Function Two:

For shows that utilize higher amounts of theatrical haze than condition one, the de-fogger fan 355 can operate during the use of the light projector 100, i.e. while light is projected in direction 360 from lens 350. In the case of condition two, the amount of air produced to de-fog the lens 350 when the light projector 100 is operated or projecting light is set to a first level amount of air flow. This can be accomplished by cycling the fan 355 off and on (interval control) or by reducing the CFM (cubic feet per minute) (voltage control) of the fan 355 during continuous operation. Fan control using interval control or by voltage control is known in the art but in any case the result is a first level of air flow that is reduced compared to the action of condition three, user settable function three to be described below. The reduced air flow of function two settable by an operator of the light projector 100 allows for successful de-fogging of the lens 350 without over applying air flow to the lens 350 that could result in debris collecting on the lens 350 at an increased rate.

(3) Condition Three, User Settable Function Three:

For shows that utilize maximum amounts of theatrical haze the operator of the light projector can choose function 3 where the de-fogger fan 355 operates to maximum apply air (in the direction of arrow 316) to the lens surface 350a of the output lens 350 while the light projector is being operated or projecting light.

(4) Condition Four, User Settable Function Four:

For shows that utilize no or very low amounts theatrical haze it is not necessary to operate the de-fogger fan 355 either when the light projector 100 is operated or the light projector 100 is off (not in use). This can save the lens 350 from having any debris from blowing onto the lens 350 by the defogger fan 355 during a de-fogging function such as function one, two or three. For function four the de-fogger fan 355 is disabled from operating either during the time the light projector 100 is operated or if the light projector 100 is not operated or projecting light.

FIGS. 2A-B show alternative methods of de-fogging the lens 350.

FIG. 1 shows light projector 100 with housing 101. A circuit system or circuit board 120 is shown that contains the electronics that enables the light source 328 and contains device output controls 214 and 216. Device output control 214 controls the cooling fan 310 for the light source 328 (through connection points 230 and 232 for simplification of the drawing). The light source cooling fan 310 brings in external air from the outside environment in the direction of arrow 308 and applies air in the direction of arrow 312 to a heat sink 322. The light source 328 may be a solid state light source and the light source 328 may be connected to the heat sink 322 in order to dissipate unwanted heat generated by the light source 328. The light source 328 may be a different type of light source such as a plasma, halogen or electric arc.

The light output by the light source 322 as shown by arrow 330 is collected by condensing lens 334. The condensing lens 334 outputs the collected light in the direction of arrow 340 to be collected by output lens 350. The lens 350 outputs the collected light as shown by arrow 360 to be projected upon a performer, screen or stage surface during a show. The output lens 350 has a plurality of sides or surfaces. Light collection side 350a of lens 350 is located within the housing 101. Light output side 350b of lens 350 is located to the outside of housing 101 and is exposed to the outside environment. Lens 350 also shows side 350c which is the perimeter of the lens 350. Cooling air generated by the light source cooling fan 310 in the direction of 312 passes over the heat sink 322 and finds exit at the exiting vent 312 to the external environment in the direction of arrow 314.

A communications connector 112 may be compatible with the DMX theatrical protocol as known in the art. The communications connector 112 routes the external communications (which may also be compatible with the DMX "Digital Multiplex" theatrical protocol) to communications port 208. The communications port 208 provides external control system commands to the processor 210. The processor 210 acts in conjunction with the memory 212 under operating system instructions, such as computer software or computer programmed instructions, that have been stored in the memory 212. The memory 212 may be a computer memory or electronic memory such as RAM (random access memory) or ROM (read only memory) or other type of memory. The processor 210 acting upon operating system instructions can send control commands to the light source control 220 to enable the light source 328 upon external commands received by the communications port 208.

The processor 210 upon receiving external communications from the communications port 208 and acting upon operating system instructions can send control commands to the device output controls 214 and 216. Device output control 214 can enable and control the light projector cooling fan 310 (through connection points 230 and 232 shown for wiring simplification). Device output control 216 can enable and vary the output of the de-fogger fan 355 (through connection points 240 and 242 shown for wiring simplification).

External connector 118 is a power connector that may be a line cord and is connected to a power source. Connector 118 routes power to the system power supply 225. The system power supply 225 supplies the power to the circuit 120, the light source 328, the light source cooling fan 310 and the defogging fan 355.

An external operator control panel 260 that can be mounted to the housing 101 of light projector 100 has input keys 264 and 266. The operator control panel 260 has a display device for feedback to the operator so that different choices of the plurality of de-fogging functions as selected by the input keys 264 and 266 can be selected by the operator.

The external operator control panel 260 transmits input commands to the processor 210 that can act with operating instructions or computer software stored in the memory 212 to select one of a plurality of de-fogging functions by operator input action to the input keys 264 and 266 and displays the selected function to the operator by means of the display device 262.

The communications port 208 may also receive external commands via the external communications connector 112 and the external commands can contain de-fogging function commands. External commands received by the communications port 208 may be compatible with known DMX theatrical protocol. The processor 210 can receive the external commands from the communications port 208 and act with operating instructions stored in the memory 212 to select one of a plurality of de-fogging functions as desired by input action by an operator to a known external show control device or lighting console (not shown). De-fogging functions for the lighting projector 100 may be selected by either the external operator control panel 260 that may be fixed to the housing 101 or by external commands received by the communications port 208 as inputted by an operator of a known external show control device or lighting console.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A light projector for operation during a show that contains theatrical haze, the light projector comprising:
 a light source;
 a lens;
 a fan;
 a housing having an inner chamber; and
 wherein the lens has a first side and a second side;
 wherein the first side of the lens is contained within the inner chamber of the housing;
 wherein the second side the lens is outside of the inner chamber of the housing;
 wherein the fan is configured to be operated to generate air flow inside the inner chamber of the housing;
 and wherein the fan is configured to be operated to generate air flow inside the inner chamber of the housing;
 and wherein a substantial portion of the air flow is directed to impinge upon the first side of the lens to cause de-fogging of theatrical haze condensate on the first side of the lens.

2. The light projector of claim 1 further comprising
 an operator input panel in communication with the fan, and configured to allow an operator to select any one of a plurality of de-fogging functions to be executed by the fan.

3. The light projector of claim 2 wherein
 the plurality of de-fogging functions include operating the fan to cause de-fogging only when the light projector is not being used to project light.

4. The light projector of claim 2 wherein
 the plurality of de-fogging functions include operating the fan when the light projector is projecting light.

5. The light projector of claim 3 wherein
 the plurality of de-fogging functions include operating the fan when the light projector is projecting light.

6. The light projector of claim 1 further comprising
 a communications port; and
 wherein the communications port is configured to receive de-fogger commands from an external control device;
 wherein the communications port is in communication with the fan to execute the de-fogger commands; and
 wherein a first one of a plurality of de-fogging functions to be executed by the fan is configured to be selected by an operator of the external control device.

7. The light projector of claim 6 wherein
 the external control device is a lighting console.

8. The light projector of claim 6 wherein
 the communications port receives de-fogger commands compliant with the DMX protocol.

9. The light projector of claim 6 wherein
 the first one of a plurality of de-fogging functions selected by the operator operates the fan to cause de-fogging only when the light projector is not being used to project light.

10. A light projector for operation during a show that contains theatrical haze, the light projector comprising
 a light source;
 a lens;
 a resistive conductor; and
 a housing having an inner chamber; and
 wherein the lens has a first side and a second side;
 where the first side of the lens is contained within the inner chamber of the housing;
 wherein the second side of the lens is outside of the inner chamber of the housing; and
 wherein the resistive conductor is positioned relative to the lens to cause de-fogging of theatrical haze condensate on the lens.

11. The light projector of claim 10 wherein
 the resistive conductor is applied to the first side of the lens.

12. The light projector of claim 10 wherein
 the resistive conductor is a power resistor.

13. The light projector of claim 10 wherein
 the resistive conductor is configured to be responsive to a plurality of de-fogging functions from a control device; and
 wherein the plurality of de-fogging functions include operating the resistive conductor to cause de-fogging only when the light projector is not being used to project light.

14. The light projector of claim 10 wherein
 the resistive conductor is configured to be responsive to a plurality of de-fogging functions from a control device; and
 wherein the plurality of de-fogging functions include operating the resistive conductor to cause de-fogging when the light projector is projecting light.

15. The light projector of claim 10 further comprising
 a communications port; and
 wherein the communications port is configured to receive de-fogger commands from an external control device;
 wherein the communications port is in communication with the resistive conductor to execute the de-fogger commands; and
 wherein a first one of a plurality of de-fogging functions to be executed by the resistive conductor is configured to be selected by an operator of the external control device.

16. The light projector of claim 15 wherein
 the external control device is a lighting console.

17. A light projector for operation during a show that contains theatrical haze, the light projector comprising:
 a light source;
 a lens;
 an infrared light source;
 a housing having an inner chamber; and
 wherein the lens has a first side and a second side;
 where the first side of the lens is contained within the inner chamber of the housing;
 wherein the second side the lens is outside of the inner chamber of the housing;
 wherein the infrared light source is positioned relative to the lens to project infrared light onto the lens to cause de-fogging of theatrical haze condensate on the lens.

18. The light projector of claim 17 wherein
 the infrared light source projects light to a perimeter of the lens to cause heating of the lens.

19. The light projector of claim 17 wherein
 the infrared light source is comprised of at least one infrared light emitting diode.

20. The light projector of claim 18 wherein
 the light source projects light to the first side of the lens, to a central region of the lens, and substantially perpendicular to the first side of the lens.

* * * * *